United States Patent [19]

Chaconas et al.

[11] Patent Number: 4,489,902
[45] Date of Patent: Dec. 25, 1984

[54] CORD CADDY

[75] Inventors: Peter C. Chaconas, Glyndon; George W. Cowman, Monkton, both of Md.

[73] Assignee: Black & Decker Inc., Newark, Del.

[21] Appl. No.: 446,240

[22] Filed: Dec. 2, 1982

[51] Int. Cl.³ .............................................. B65H 75/38
[52] U.S. Cl. ............................. 242/100.1; 191/12.2 R
[58] Field of Search ................. 242/96, 100.1, 107.1, 242/107.11; 191/12.2 R, 12.4

[56] References Cited

U.S. PATENT DOCUMENTS

| | | | |
|---|---|---|---|
| 703,709 | 7/1902 | Olmstead | 242/107.1 |
| 977,192 | 11/1910 | Hull. | |
| 1,983,565 | 12/1934 | Replogle | 242/96 X |
| 2,052,341 | 8/1936 | Douglass | 191/12.2 R |
| 2,952,420 | 9/1960 | Von Hoorn | 242/100.1 |
| 3,202,372 | 8/1965 | Meline et al. . | |
| 3,208,121 | 9/1965 | Price . | |
| 3,532,289 | 10/1970 | Sutz . | |
| 3,809,331 | 5/1974 | Gaul . | |
| 4,322,045 | 3/1982 | Tellier | 242/100.1 X |
| 4,392,661 | 7/1983 | Langenstein | 191/12.2 R X |

Primary Examiner—John Petrakes
Assistant Examiner—Katherine Jaekel
Attorney, Agent, or Firm—Ronald B. Sherer; Harold Weinstein; Edward D. Murphy

[57] ABSTRACT

A cord caddy for carrying or storing a dispensable length of cord wherein the cord caddy includes a multi-layered reel disposed within an open-faced pan shaped housing. The cord or other flexible member will be coiled about the reel in upper and lower chambers thereof so as to be unwound (dispensed) therefrom whenever it is desired to use the extension cord. The reel will be free to oscillate within the housing during the dispensing of the cord therefrom. A cord stake will fix one free end of the cord while the opposite end is pulled so that during oscillation of the reel within the housing the housing will partake of the sliding transla-tory motion along the ground a distance that amounts to one-half of the total length of the cord exiting from the housing. The cord is free to rotate within the housing during the dispensing of the cord therefrom. Rewinding may be conveniently accomplished by taking the cord stake and inserting it through the reel and housing to fix the housing to the ground and prevent the reel from oscillating within the housing. A handle on the reel will rotate the reel about the stake and produces the rewind-ing (collecting) of the cord simultaneously in the upper and lower chambers of the reel from which it was dis-pensed.

17 Claims, 22 Drawing Figures

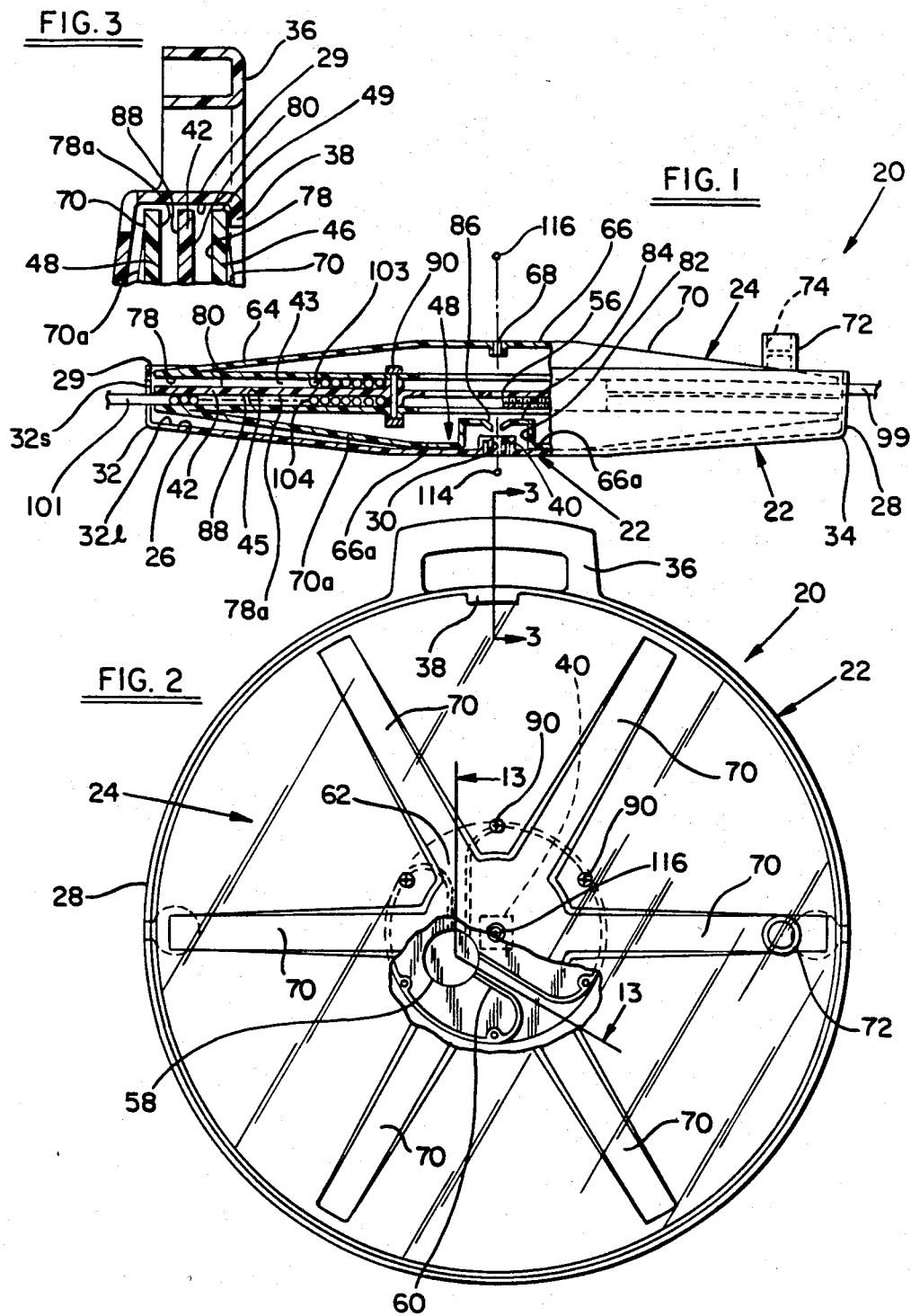

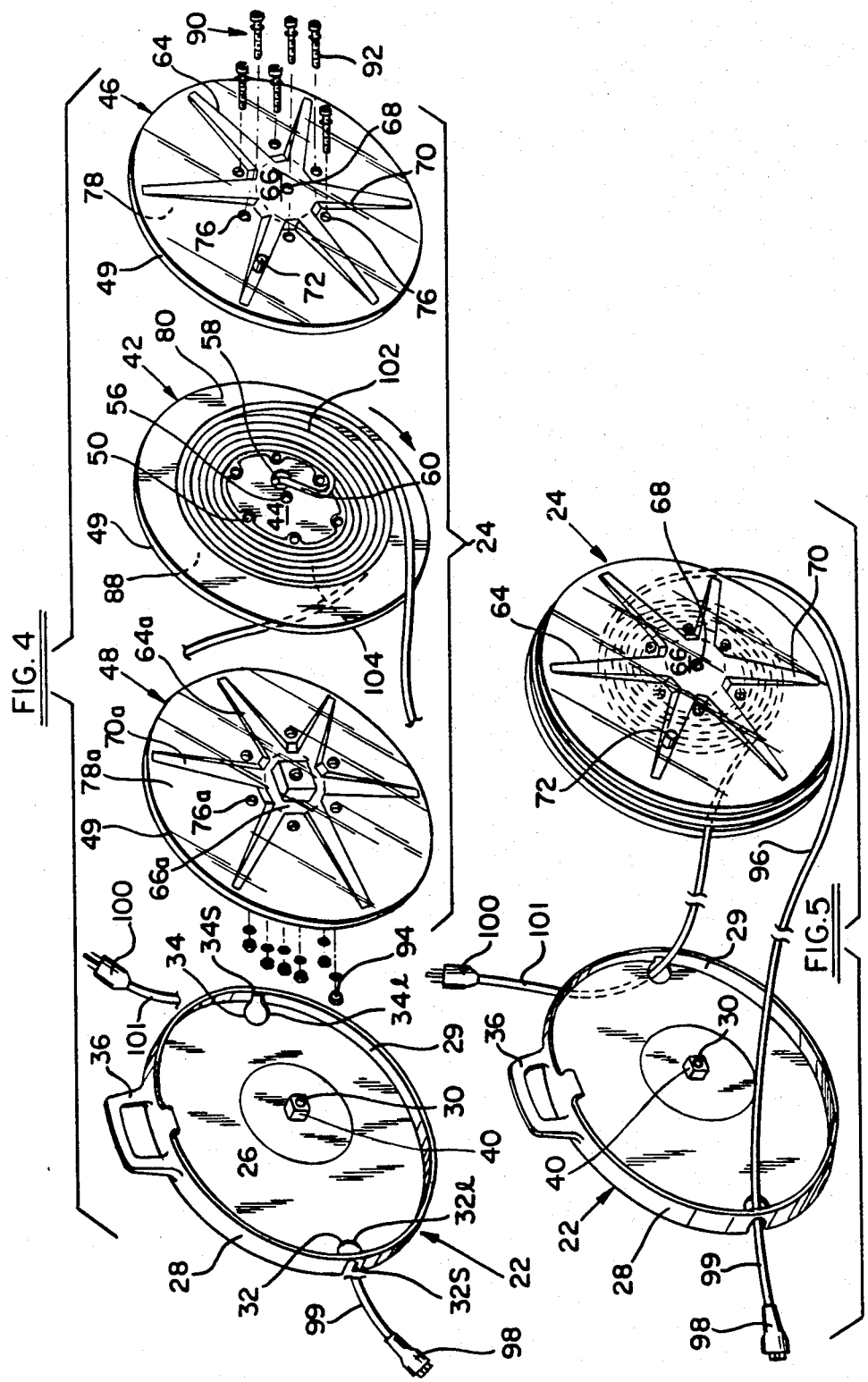

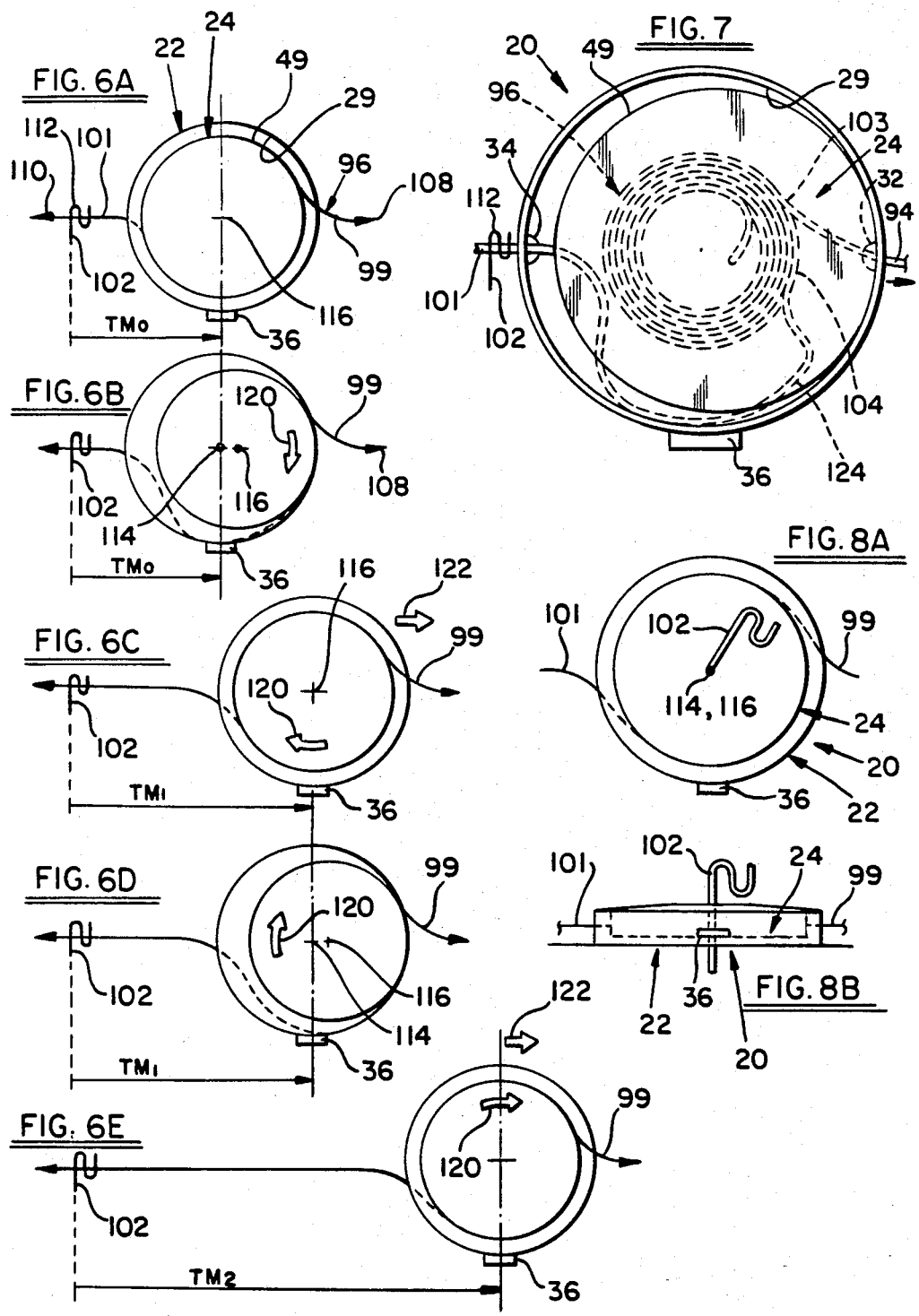

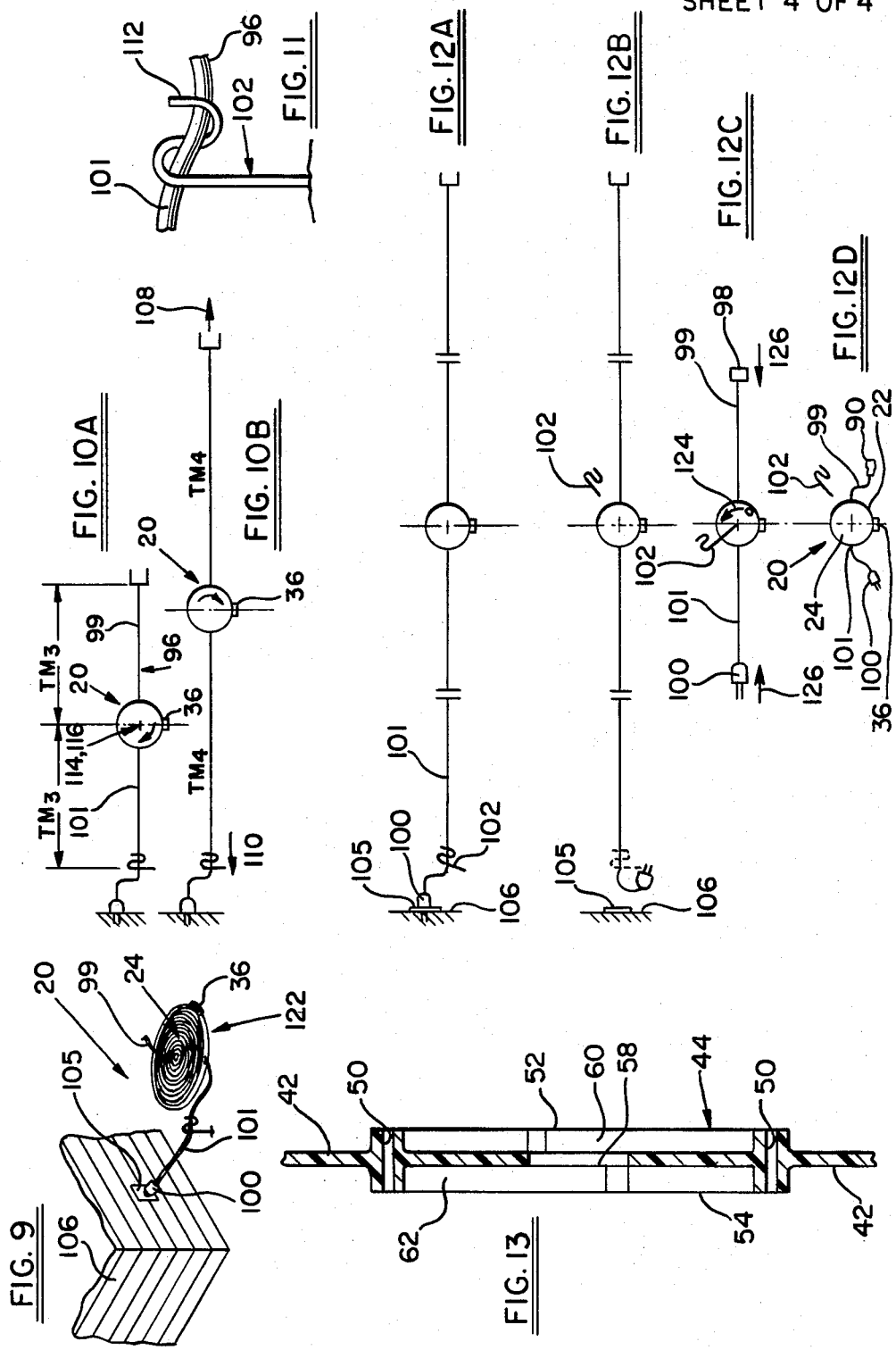

CORD CADDY

BACKGROUND OF THE INVENTION

Flexible members such as cords may conveniently be carried in cord caddies for subsequent dispensing, collecting and storing during periods of nonuse. However, prior art cord caddies have never been completely satisfactory in that for a given size the amount of cord that was dispensed was not long enough, or the operation was not sufficiently reliable whereby repeated use would result in internal tangling or knotting of the cord therein. Upon a malfunction the caddy would have to be disassembled, and even if this eventuality were provided for the problem would soon reoccur.

The prior art cord caddies were bulky, expensive and unreliable in operation. Many of the prior art cord caddies included a clutch which added to the cost and complexity of the cord caddy without aiding reliability thereof. Also, the amount of cord stored was limited, and attempts to increase the capacity only led to a higher incidence of tangling and other malfunctions during the winding or unwinding of the cord within the cord caddy. While some prior art cord caddies may be better than others it is believed that none have been fully satisfactory so that the problem of developing a simple, inexpensive and reliable cord caddy remains.

SUMMARY OF THE INVENTION

In accordance with the present invention the novel cord caddy is used to carry a dispensable length of cord and includes a reel shiftably disposed in a housing. The cord is wound about the reel which has an upper and lower portion so that upon unwinding the cord will be dispensed or collected simultaneously from both portions. During dispensing the reel is free to shift or translate within the housing so as to frictionally engage the housing and compensate for the pulling and reactive forces of the cord thus permitting the reel to rotate in dispensing the cord while the housing slides along the ground in the direction of the pull. The reel has a central hub through which the cord passes to be wound simultaneously about the upper and lower portions thereof.

Upon rewinding, a cord stake will journal the reel within the housing and fix the housing to the ground so that the reel is prevented from shifting within the housing and the housing remains stationary.

The stake may serve a double duty of holding one free end of the cord during the dispensing operation so that if it were an electrical cord, the cord may be staked adjacent the electrical outlet to which it will be connected.

It is an object of the present invention to provide an improved cord caddy which overcomes the prior art disadvantages; which is simple, economical and reliable; which has a reel rotatably disposed in a housing and during dispensing (unwinding) of the cord is free to oscillate therein, and during collecting (winding) a stake will journal the reel and the housing to prevent relative oscillation; which has a reel having multilayers therein; which has a reel with a plurality of layers one of which is intermediate to divide the reel into an upper and a lower portion; which has a housing provided with a integrally formed handle in which the reel will be shiftable disposed; which housing has openings through which the free ends of the cord will exit diametrically opposite one another; and which reel has a handle to facilitate winding thereof within the housing.

Other objects and advantages will be apparent from the following description of one embodiment of the invention and the novel features will be particularly pointed out hereinafter in the claims.

BRIEF DESCRIPTION OF THE DRAWINGS

This invention is illustrated in the accompanying drawings in which:

FIG. 1 is a side elevational view, partly in section, of the cord caddy embodying the present invention.

FIG. 2 is a top plan view of the cord caddy shown in FIG. 1, without the cord.

FIG. 3 is a view taken along line 3—3 of FIG. 2.

FIG. 4 is an exploded perspective view of the housing and the reel, with the reel unassembled and exploded to show the plurality of layers and the cord wound about a hub of an intermediate layer upon upper and lower portions thereof.

FIG. 5 is an exploded perspective view of the housing and the reel, with the reel assembled.

FIGS. 6, A through E, shows the oscillating steps of the reel within the housing during the dispensing operation wherein: 6A shows one end of the cord staked and the other end free and ready to be pulled rightwardly in the direction of the arrow shown; 6B shows the cord being pulled to shift or translate the reel into frictional engagement with the housing; 6C shows the reel once again centered subsequent to the translational movement of the housing; 6D shows the reel shifted once again into frictional engagement with the housing caused by continued or a new pull on the cord; and 6E has the reel once again centered during the continued translational movement of the housing in the direction of the pull.

FIG. 7 is an enlarged view partly in section of FIGS. 6C and 6E wherein the fixed end of the cord on the under side of the housing is shown partially spinning out to frictionally engage the housing during the forward oscillation of the reel.

FIGS. 8A and 8B show the cord stake fixed in the cord caddy with 8A showing a plan view and 8B showing a side elevational view with the cord caddy ready for the wind up operation.

FIG. 9 shows the improved cord caddy adjacent a building structure with one of the free ends of the cord staked and plugged into an electrical outlet prior to the cord being dispensed therefrom.

FIGS. 10A and 10B is a diagramatic representation of the dispensing operation of the cord caddy wherein the reel rotates and the housing translates.

FIG. 11 is an enlarged view showing the cord stake wherein the cord has been affixed thereto to be held in position.

FIGS. 12A through 12D shows the wind up operation wherein 12A has the cord fully extended and the plug end staked prior to wind up; 12B shows the cord unplugged and unstaked and the stake about to be applied to the cord caddy; wherein 12C shows the stake affixing the reel and housing of the cord caddy for rapid rewinding of the cord; and wherein 12D is the cord caddy fully rewound.

FIG. 13 is an elevational view taken along line 13—13 of FIG. 2.

DESCRIPTION OF THE PREFERRED EMBODIMENT

In the illustrated embodiment of the invention the improved cord caddy, designated generally as 20, is shown in FIGS. 1, 2, 4 and 5 to include a housing 22 and a reel 24 shiftably disposed therein.

The housing 22 shown in FIGS. 2, 4 and 5 is pan-shaped with a circular bottom wall 26 substantially flat for large area ground engagement with the underside thereof. Above the wall 26, the housing is open. The outer periphery of the wall 26 turns upwardly to form an annular flange 28 having an inner surface 29. The center of the wall 26 has an opening 30. A pair of keyholes 32, 34 shown in FIGS. 2, 4 and 5 are formed in line with the opening 30 at diametrically opposite ends of the wall 26 with the respective larger openings 32*l*, 34*l* thereof in the wall 26 and the smaller openings 32*s*, 34*s* thereof extending upwardly of the flange 28. A handle 36 is formed outwardly of the flange 28 on the side midway above the keyhole openings 32 and 34 as shown best in FIG. 2. A tab 38 illustrated best in FIGS. 3 and 4 extends radially inwardly from the upper edge of the inner surface 29 of the flange 28 in the area of the handle 36 above the wall 26. The opening 30 may be formed to extend through a square boss 40 extending upwardly from the wall 26 in the same direction as the flange 28 so as to serve as a journal for purposes described hereinafter.

The reel 24 has a plurality of layers or discs of which the intermediate layer 42 has an integrally formed central hub 44 illustrated in FIGS. 4 and 13. An upper layer 46 and a lower layer 48 are connected to opposite sides of the hub 44 of the intermediate layer 42 to form radially open upper chamber 43 and lower chamber 45 of the reel 24. Each layer 42, 46 and 48 has the same diameter and each has an edge 49 which will act in common, and is slightly smaller than the diameter of the wall 26 at the inner surface 29 so that the reel will loosely fit within the annular flange 28 and be shiftable from side to side therein to oscillate in a manner described hereinafter.

The central hub 44 shown in FIGS. 2, 4 and 13 has peripheral apertures 50 circumferentially spaced to extend from the flat top 52 to the flat bottom 54 between which the intermediate layer 42 is disposed parallel and equidistantly spaced. The hub 44 shown in FIGS. 2, 4 and 13 has a central opening 56, and an enlarged off-centered opening 58 at least as large as the larger openings 32*l*, 34*l* of the keyholes 32, 34. The off-centered opening 58 communicates with a substantially horizontal channel 60 formed in the top side 52 and more than 90° away a lower channel 62 is formed in the bottom 54, with each of the channels 60, 62 having flared openings with rounded corners adjacent opposite pairs of connecting apertures 50.

Each of the layers 42, 46 and 48 are substantially disc-shaped and the respective opposed faces thereof are substantially parallel to each other as illustrated in FIGS. 1, 4 and 5. The upper layer 46 has a spoked, star-shaped upwardly raised projection 64 with a central portion 66 having a central opening 68 in alinement with the opening 56 of layer 42 and six ribs 70 circumferentially spaced to radiate from the central portion 66 toward the flat surface of layer 46 to terminate a short distance from the outer edge 49. The ribs 70 add structural rigidity to the layer 46 and provide convenient secondary hand grips. The handle 72 is formed adjacent the end of one of the ribs 70 as illustrated in FIGS. 1, 2 and 4 which may have a finger detent 74 extending inwardly from the top thereof. Six holes 76 are formed in the layer 46 radially outwardly from the central projection 66 between adjacent ribs 70 and alined with the openings 50 formed in the hub 44. The layer 46 has an inner surface 78 shown best in FIGS. 1 and 3 which faces the upper surface 80 of the layer 42, with each surface smooth and substantially parallel to each other.

The lower layer 48 will be similarly formed and oppositely facing as that of the upper layer 46, except as noted, and therefor will be given the same reference character as previous given for the layer 46 with the addition of a small "a" to designate that such component is on the layer 48. The layer 48 illustrated in FIGS. 1 and 4 has no comparative handle as that of handle 72 of layer 46, and to accommodate the boss 40 of the housing 22 the layer 48 has a central projection 66*a* which has a central depression 82 that extends upwardly in the direction of the hub 44 to terminate in a flat raised surface 84 with a central funnel opening 86 which decreases downwardly into a small opening alined with the opening 30 of the boss 40. Briefly, the layer 48 has a surface 78*a* facing the underside 88 of the intermediate layer 42 and parallel thereto to define a space equal to that which exists between the faces 78 and 80 of the respective layers 46 and 42. Accordingly, there is the raised projection 64*a* with a central portion 66*a* from which the ribs 70*a* radiate and at the base of which is formed the openings 76*a* radially outwardly therefrom.

Fastening means 90 in the form of screws 92 and nuts 94 extend through each of the alined holes 76, 50 and 76*a* to assemble the reel 44 whereby the multilayers 46, 42 and 48 are affixed to the hub 44 of the layer 42 as illustrated in FIGS. 1 and 5. When the housing 22 is horizontal as shown in FIG. 1, the annular portion 66*a* of the layer 48 engages the flat portion of the wall 26. There is sufficient clearance between the depression 82 and the boss 40 so that a space will exist therebetween, thus permitting relative rotation of the reel 24 and the housing 22.

A flexible member of suitable length such as an electric cord 96 is dispensably mounted on the reel 24 of the cord caddy 20, and will have a socket 98 and a plug 100 formed at each of its respective free ends 99 and 100 respectively, as best shown in FIGS. 4 and 5. The socket 98 and the plug 100 are substantially of the same cross-sectional area and are small enough to be inserted through hole 58, or openings 32*l* 34*l* of the keyholes 32, 34, which will be done prior to assembly and winding of the reel 24 of the cord caddy 20. By placing the cord 96 at midpoint within the hole 58 and channels 60 and 62 the cord 92 can have equal halves wound in the upper and lower chambers 43 and 45 of the reel 24.

The gauge of the cord 96 will determine the spacing between adjacent layers 48, 42 and 46 so that the spacing is set to be large enough to permit easy entrance and exit of the cord 96 therebetween, e.g., to provide a loose fit.

Once the cord 96 has its midpoint placed within the off-center hole 86 and lies within the respective upper and lower channels 60 and 62 the cord 96 may be suitably wound in coils upon the reel 24 in a single upper ribbon 103 and a single lower ribbon 104 as shown in the FIGS. 1 and 4 of the preferred embodiment of the invention. Subsequent to assembly of the reel 24 including the winding of a suitable length of cord 96 which in the preferred embodiment will be substantially 50' in each of the upper and lower ribbons 102 and 104 respectively, so as to total a 100 foot extension cord, the plug end 100 will be inserted in the keyhole 34 and the socket end 98 will be inserted in the keyhole 32. Thereafter, the reel 24 will be placed within the housing 22 wherein the tab 38 will extend over the outer edge of the upper layer 46 as shown best in FIG. 3 but stop short of contacting the end of the rib 70. Thus for storing and carrying purposes the handle 36 may be used and the outwardly extending free ends 99 and 101 will extend through the keyholes 32 and 34 respectively, and combine with the tab 38 normally to prevent removal of the reel 24 from the housing 22 into which it is loosely fitted. In any event, the openings 32 and 34 extend up the flange 28 sufficiently to permit horizontal exit of the cord 96 from the flange 28 of the housing 22 via the respective ends 99 and 101 as illustrated in FIG. 1 after the socket 98 and plug 100 have been once exited the keyholes 32 and 34 respectively, so that once assembled the cord 96 will always lie in the upper or lower chamber 43, 45 to exit via opening 32s and 34s and will never exit the housing 22 from the opening 32l and 34l of the bottom wall 26. The reel 24 is free-floating within the housing 22 but the clearance between edge 49 and inner surface 29 is sized to prevent the cord 96 from being pinched or wedged therebetween to prevent free exit or entrance of the cord 96 out of or into the cord caddy 20.

A cord stake 102 illustrated in FIGS. 8, 9 and 11 is included for the cord caddy 20 and serves the dual function of: (1) axially fixing the reel 24 and the housing 22 by staking the cord caddy 20 to the ground during the winding (collecting) operation (FIGS. 8 and 12); and (2) staking the cord 96 to the ground at the free end 101 adjacent the plug 100 being inserted in a suitable electrical outlet 105 mounted on the exterior of a building 106 during the unwinding (dispensing) operation as illustrated in FIGS. 6 and 10.

Thus, the cord caddy 20 has two distinct modes of operation, namely, the respective winding (collecting), and unwinding (dispensing) of the cord 96 relative thereto. Each distinct operation will be discussed separately herein.

The dispensing (unwinding) operation will be discussed first as shown in FIGS. 6, 7, 9 and 10 wherein the cord caddy 20 is in assembled position with the cord 96 fully wound thereon. The cord caddy 20 has its components made of various plastic materials. The housing 22 is made of high-impact polystyrene, the outer layer of the cord 96 is made of flexible polyvinyl chloride, the intermediate layer 42 is made of general-purpose polystyrene, and the upper and lower layers 46 and 48, respectively, of the reel 24 are made of a clear see thru general-purpose polystyrene. In assembled position the cord caddy 20 has the reel 24 free floating within the housing 22 so that the reel 24 is easily shifted and will oscillate responsive to an externally applied force exerted upon to the free ends 99, 101 of the cord 96. This is shown graphically in FIG. 6. Subsequent to the plug 100 being connected to the electric outlet 105, the free end 101 of the cord 96 is passed through a serpentine end 112 of the cord stake 102 to be clamped in place therein. Thus with the cord stake 102 driven into the ground the free end 101 will be fixed at that location. FIG. 6A shows a plan view wherein the housing 22 has the underside of wall 26 lying flat upon the ground and the free end 99 of the cord 96 ready to be pulled in the direction of the arrow 108 via the dispensing operation.

FIG. 6A shows an exaggerated spacing between edge 49 of the reel 24 and the surface 29 of the housing 22 to facilitate an understanding of the operation of the cord caddy during the dispensing mode. The housing 22 has an axis 114 shown in FIGS. 1 and 6B passing through the center of the opening 30, and the reel 24 has an axis 116 shown in FIGS. 1 and 6A passing through the center of the respective openings 68, 56 and 86 forming the multiple layers thereof. The distance $TM_o$ lies from the stake 102 to a line through the housing axis 114. FIGS. 6A, 6C and 6E show the axes 114 and 116 coincident (See FIG. 1) with only the axis 116 being designated.

The free end 99 exits from the ribbon 103 in the upper chamber 43 of the reel 24 which lies between the upper layer 46 and the intermediate layer 42. Upon the free end 99 of the cord 96 being pulled rightwardly as shown by the directional arrow 108 of FIG. 6B, the reel 24 will begin to rotate clockwise as indicated by the arrow 120 and thus be translated or shifted off the center line or housing axis 114 to be placed in a over-center position with the reel axis 116 disposed rightwardly thereof. The pull of the free end 99 causes the edge 49 to abut the inner surface 29 in frictional engagement therewith at the keyhole 32. There is also frictional engagement caused by the rotation of the reel 24 at the under-side of the raised portion 66a where it contacts the wall 26 of the housing radially outwardly of and spaced from the boss 40. The frictional contact between the respective surfaces 49 and 29, and 66a and 26 continually increases as it attempts to stop rotation of reel 24, or until it equals a force large enough to cause a rightward shift of the housing 22 from the position shown in FIGS. 6A and 6B to the position shown in FIGS. 6D and 6E, measured by the distance $TM_1$. A equal and opposite reactive force 110 will be created at stake 102. Once the housing 22 partakes of a translational movement to slide the housing 22 rightwardly as shown by the arrow 122 the respective frictional forces will be balanced thus causing the reel to shift incrementally leftwardly to once again place the axis 114 and 116 coincident to each other as illustrated in FIG. 6C while the reel 24 continues to rotate clockwise as shown by the arrow 120 thus playing out more of the cord 96 at both free ends 99 and 101. Since the cord 96 exits the housing at both keyholes 32 and 34, each will be dispensed substantially equally during the pull of the free ends 99. Then the tension (arrow 108) again takes up the slack, which re-initiates the frictional engagement between surfaces 49 and 29, and 66a and 26, again causing translational movement of the housing. The increasing translational movement is indicated by the rightwardly facing arrow 122 shown in FIGS. 6C and 6E. The distance that the housing has moved from its original start position at the stake is indicated by the marked distance designated $TM_2$ shown in FIG. 6E. During the continual pulling motion of the free end 99 the reel 24 will continue to alternate or oscillate first rightwardly as shown in FIGS. 6B and 6D to shift the reel 24 off-center wherein the axes 114 and 116 are no longer coincident; and second, to return to a self-balanced position relative to housing 22, represented by the coincidence of axes 114 and 116.

As shown in FIG. 7, during the pull out of the free end 99, the other end 101, which is fixed in place by the stake 102, produces a small spin out of the cord as at 124 as it is unwound from the lower ribbon 104 and prior to its exiting the housing 22 at the keyhole 34. This spin out causes a short length of cord 124 to frictionally engage the inner surface 29 in the general area adjacent the handle 36 to add another component to the frictional drag producing the self-balancing of the reel 24 within the housing 22. The net effect of the above-noted combination of forces is a constant equalizing of the tensions applied to each end of the cord, producing a substantially equal playing out of cord from both sides of the caddy 20, in a manner which compensates for variations in terrain.

The translational movement as measured from the stake 102 as shown in FIG. 10 will equal either of the lengths of cord exiting the housing, and the total cord length 96 will therefore equal twice the translational movement of the housing 22. Since the maximum cord length in the preferred embodiment would be 100 feet the translational movement or the movement of the housing 22 would be equal to approximately 50 feet. FIG. 10A shows a housing 22 having partaken of a translational movement for each of the free ends 99 and 101, respectively, as being $TM_3$ while FIG. 10B shows the translational movement to be a distance $TM_4$. The pulling would continue until the maximum cord length equals substantially 50' on either side of the housing 22, the length of the extension cord in the preferred embodiment.

Whenever the operator desires to collect (wind) the extension cord 96 within the housing 22, a rewinding operation will be performed. The wind up operation is depicted graphically in FIGS. 8 and 12. The cord stake 102 illustrated in FIG. 12A will be removed from the ground and the free end 101 of the cord 96 and the plug 100 will be unplugged from the outlet 105. Thereafter, the cord stake 102 will be placed at the axes 114, 116 of the housing 22 as shown in FIG. 12B, and is subsequently inserted as illustrated in FIG. 8A into the opening 68 to pass along the axis 116 of the reel 24. It will then be extended through the opening 56 and 86 to reach alinement with the axis 114, and pass through the opening 30 of the housing 22 to fixedly stake the housing 22 to the ground, thereby preventing oscillation of the reel 24 within the housing 22. By forcing the axes 114 and 116 to remain coincident the stake 102 thereby maintains the reel 24 centered within the housing 22. Therefore the edge 49 of the reel 24 remains out of frictional engagement with the inner surface 29 of the flange 28 of the housing 22 (see FIGS. 6A and 6C). The only frictional contact is that caused by gravity wherein the underside of the lower layer 48 of the reel 24 is slideable engaged upon the upper surface of the wall 26 in the area spaced from and adjacent to the boss 40. The operator will grasp the handle 72 of the reel 24 and may conveniently hold the handle 36 of the housing 22. While rotating the reel 24 via its handle 72 in a counterclockwise direction, the cord 96 is rewound simultaneously about the upper and lower chambers 43 and 45 thereof to reform the coiled ribbons 103 and 104 of the cord 96. This is shown graphically in FIG. 12C wherein the counterclockwise arrow 124 indicates the rewinding direction while the arrows 126, 126 at the respective socket 98 and plug 100 face towards each other from opposite directions toward the housing 22. The housing 22 remains substantially stationary during the winding operation. Upon completion of the rewinding operation the stake 102 is removed as illustrated in FIG. 12D and the cord caddy 20 is ready to be stored, or to be transported for its next use with the free ends 99 and 101 and the respective socket 98 and plug 100 extending from the housing 22 and the cord 96 fully rewound upon the reel 24 disposed therein.

It will be understood that various changes in the details, materials, arrangements of parts and operating conditions which have been herein described and illustrated in order to explain the nature of the invention may be made by those skilled in the art within the principles and scope of the invention.

Having thus set forth the nature of the invention what is claimed herein is:

1. A cord caddy for carrying a dispensable length of cord, comprising:
   a. a housing;
   b. a reel within said housing and having a central hub about which the cord is wound;
   c. the cord having two ends extending in opposite directions from the housing;
   d. means for mounting said reel in said housing to normally partake of both rotational and translational movement relative to said housing responsive to the application of tension force upon at least one of said cord ends, whereby said housing moves along a surface as said cord is dispensed from said reel; and
   e. said means for mounting being normally essentially free of an axle journaling said hub to said housing.

2. The cord caddy claimed in claim 1, wherein:
   a. the housing being pan-shaped with an open top and including a circular flange having an inner diameter;
   b. the housing further including a bottom;
   c. the reel being circular and having a smaller outer diameter than the inner diameter of the housing flange, and further having a bottom;
   d. said means for mounting including an upstanding central boss formed on said housing bottom, and having a predetermined breadth;
   e. said means for mounting further including a central depression formed in the bottom of said reel and extending upwardly in said reel in the direction of said hub, and overlying said boss; and
   f. said central depression having a breadth sufficiently greater than that of said boss to permit translational shifting of said reel relative to said housing.

3. The cord caddy claimed in claim 2, further comprising means movably connectable to said reel for journaling the reel to the housing to cause the reel to partake of rotational, non-translational movement relative to the housing.

4. The cord caddy claimed in claim 3, wherein said means for journaling including a removable axle releasably journaling the reel to the housing.

5. The cord caddy claimed in claim 4, wherein:
   a. the reel including an upper layer and a lower layer;
   b. the hub defining a hub central opening;
   c. the reel upper and lower layers defining respective reel upper and lower central openings in axial alignment with said hub central opening;
   d. said housing boss defining a central opening; and
   e. said axle being removably insertable through said reel upper and lower central openings and said housing boss central opening.

6. The cord caddy claimed in claim 5, wherein:
   a. said reel bottom central depression terminating in a flat raised surface; and
   b. said reel lower central opening being defined by a central funnel, formed in said flat raised surface, the diameter of which decreases downwardly into an opening aligned with the housing boss central opening.

7. The cord caddy claimed in claim 1, further comprising means removably connectable to said reel for limiting the reel to rotational, non-translational movement relative to the housing.

8. The cord caddy claimed in claim 1, wherein:
   a. the housing being pan-shaped and having an open top;
   b. the means for mounting further including means for limiting axial movement of the reel relative to the housing.

9. The cord caddy claimed in claim 8, wherein said means for limiting axial movement including a tab-formed on the housing and overlying a portion of the reel.

10. A cord caddy for carrying a dispensable length of cord, comprising:
    a. a pan-shaped housing having an open top, a closed bottom and a circular flange;
    b. a reel upon which the cord is wound, and being rotatively disposed in the housing;
    c. the reel being circular and of smaller diameter than the diameter of the housing flange to permit translational shifting of the reel therein;
    d. the cord having two ends, each of which extending outwardly of the housing, one end being pulled to rotate and shift the reel during dispensing of the cord therefrom, the other end being held so that the housing is forced to slide substantially one-half the distance of the translational motion of the said end being pulled;
    e. means for journaling the reel within the housing to prevent the reel from shifting therein during collection of the cord upon rotation of the reel to rewind the cord thereon; and
    f. said means for journaling the reel within the housing being connectable to said other end of the cord to hold each other end of the cord during dispensing of the cord from the cord caddy.

11. The cord caddy claimed in claim 10, wherein said means for journaling including a stake connectable to the housing to journal the reel therein.

12. A cord reel for dispensing and storing cord comprising:
    a. a reel having a central hub and a pair of members connected on either side of the hub to form a chamber therebetween;
    b. a separator extending outwardly from the hub intermediate of the pair of members to divide the chamber into an upper portion and a lower portion;
    c. the hub having an aperture communicating with the upper and lower portion of the chamber;
    d. a cord of predetermined length extending through the aperture and windable about the hub on either side of the separator in both the upper and lower portions of the chamber;
    e. the cord having two ends, each extending from a respective upper and lower portion of the chamber;
    f. a housing having the reel shiftably disposed therein;
    g. the housing having a ground engaging surface;
    h. the ends of the cord extending outwardly from opposite sides of the housing whereby upon fixing one end of the cord and pulling the other end of the cord, the cord will be dispensed from the reel in substantially equal amounts from each end by rotating the reel within the housing while the housing slides upon the ground in the direction of pull;
    i. the reel being free to oscillate translationally within the housing during the dispensing of the cord;
    j. means for journalling the reel within the housing to prevent oscillation thereof during the cord collection upon rotation of the reel in the direction opposite that of dispensing; and
    k. means for fixing the said one end of the cord during the dispensing of the cord, said means for fixing being selectively positionable between fixing one end of the cord or journaling the reel within the housing.

13. A cord caddy for carrying and dispensing a length of cord comprising:
    a. a reel having a plurality of layers and a central hub having an opening therein;
    b. an intermediate layer extending from the hub to separate the reel into an upper portion and a lower portion;
    c. a cord extending through the opening to be wound about the hub on either side of the intermediate layer in sandwiched disposition between the layers;
    d. the cord having free ends exiting the reel, one from the upper portion and the other from the lower portion;
    e. a housing for carrying the reel and from which the free end of the cord exits;
    f. the housing having a flat wide engaging the ground during dispensing and collecting the cord;
    g. the cord being dispensable by fixing one free end thereof and pulling the other free end thereof to cause the reel to rotate within the housing to unwind substantially equal amounts of cord from the upper and lower portions thereof, the reel translationally shifting in the housing as a result of frictional engagement between the dispensing cord, the reel and the housing during movement of the housing in the direction of the pull of the other free end of the cord;
    h. the cord being collected by rotating the reel within the housing to rewind the cord therein;
    i. means for fixing the reel to the housing to permit the reel to rotate therein and to prevent the reel from oscillating therein; and
    j. the means for fixing further selectively journaling the reel within the housing during the cord collection operation, or fixing the one free end of the cord during the cord dispensing operation.

14. A cord caddy for carrying a dispensable length of cord, comprising:
    a. a housing;
    b. a reel within said housing and having a central hub about which the cord is wound;
    c. the cord having two ends extending in opposite directions from the housing; and
    d. means for mounting said reel in said housing to normally partake of both rotational and translational movement relative to said housing responsive to the application of tension force upon at least one of said cord ends, whereby said housing moves along a surface as said cord is dispensed from said reel; and
    e. means independent of said cord and removably connectable to the reel for limiting the reel to rotational, non-translational movement relative to the housing.

15. The cord caddy claimed in claim 14, wherein:
    a. said means for limiting the reel including an axle removably connectable to said reel and said housing; and
    b. said axle journaling the reel to the housing.

16. The cord caddy claimed in claim 16, wherein said axle further including means for fixing one end of said cord during dispensing of the cord.

17. An axle-less cord caddy for carrying a dispensable length or cord, comprising:
   a. a pan-shaped housing having an open top;
   b. a reel within said housing and having a central hub and an axis of rotation;
   c. means for mounting said reel in said housing to partake of both rotational and translational movement relative to said housing;
   d. said means for mounting including means for limiting axial movement of said reel relative to said housing;
   e. said reel including a bottom having a central depression adjacent said central hub;
   f. said housing having a bottom including an upstanding boss;
   g. said central depression overlying said boss;
   h. said central depression being sized to permit translational and rotational movement of the reel relative to the housing; and
   i. means releasably connecting said reel to said housing via said hub and said boss.

* * * * *